United States Patent
Smith et al.

(10) Patent No.: US 6,671,151 B2
(45) Date of Patent: Dec. 30, 2003

(54) NETWORK PROTECTOR RELAY AND METHOD OF CONTROLLING A CIRCUIT BREAKER EMPLOYING TWO TRIP CHARACTERISTICS

(75) Inventors: David Robert Smith, McKeesport, PA (US); John Robert Moffat, Jr., Greenwood, SC (US); Thomas Joseph Kenny, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 175 days.

(21) Appl. No.: 09/971,317

(22) Filed: Oct. 3, 2001

(65) Prior Publication Data

US 2003/0063421 A1 Apr. 3, 2003

(51) Int. Cl.[7] .................................................. H02H 3/08
(52) U.S. Cl. .......................... 361/93.2; 361/63; 361/65; 361/76; 361/78
(58) Field of Search ................................ 361/62–66, 77, 361/76, 78, 82, 84–88, 91.1, 93, 1, 93.2, 93.5

(56) References Cited

U.S. PATENT DOCUMENTS

| | | | |
|---|---|---|---|
| 3,947,728 A | 3/1976 | Smith | |
| 4,293,886 A * | 10/1981 | Church et al. | 361/71 |
| 4,972,290 A | 11/1990 | Sun et al. | |
| 4,994,934 A | 2/1991 | Bouhenguel | |
| 5,367,426 A | 11/1994 | Schweitzer, III | |
| 5,587,917 A | 12/1996 | Elms | |
| 5,822,165 A | 10/1998 | Moran | |
| 5,844,781 A | 12/1998 | Schlotterer et al. | |
| 5,936,817 A | 8/1999 | Matsko et al. | |
| 6,498,709 B2 * | 12/2002 | Kurosawa et al. | 361/80 |
| 6,504,693 B1 * | 1/2003 | Moffat et al. | 361/62 |

* cited by examiner

*Primary Examiner*—Michael Sherry
*Assistant Examiner*—Gary L. Laxton
(74) *Attorney, Agent, or Firm*—Martin J. Moran

(57) ABSTRACT

A network protector relay controls a circuit breaker connected between polyphase feeder and network busses. A circuit samples polyphase circuit breaker current and network voltage to generate digital polyphase current and voltage samples. A microcontroller generates positive sequence current and voltage vectors from the current and voltage samples. A first trip algorithm trips the breaker in response to the positive sequence current vector being in a first trip region of a first trip characteristic with respect to the positive sequence voltage vector. The first trip characteristic is defined by a reverse trip setpoint and a first positive angle. A second trip algorithm trips the breaker in response to the positive sequence current vector being in a second trip region of a second trip characteristic with respect to the positive sequence voltage vector. The second trip characteristic is defined by the reverse trip setpoint and a second negative angle.

20 Claims, 5 Drawing Sheets

NETWORK PROTECTOR RELAY AND METHOD OF CONTROLLING A CIRCUIT BREAKER EMPLOYING TWO TRIP CHARACTERISTICS

BACKGROUND OF THE INVENTION

1. Field of the Invention

This invention relates to network protector relays used to control circuit breakers and, more particularly, to such network protector relays for circuit breakers connecting feeders to low-voltage secondary power distribution networks. The invention also relates to a method of controlling a circuit breaker employing two trip characteristics.

2. Background Information

Low-voltage secondary power distribution networks consist of interlaced loops or grids supplied by two or more sources of power, in order that the loss of any one source will not result in an interruption of power. Such networks provide the highest possible level of reliability with conventional power distribution and are, normally, used to supply high-density load areas, such as a section of a city, a large building or an industrial site. Each power source is a medium voltage feeder supplying the network and consists of a switch, a transformer and a network protector. The network protector includes a circuit breaker and a control relay. The control relay senses the transformer voltages, the network voltages and the line currents, and executes algorithms to initiate breaker tripping or reclosing action. Trip determination is based on detecting reverse power flow, that is, power flow from the network to the primary feeder.

Examples of network protector relays are disclosed in U.S. Pat. Nos. 3,947,728; 5,822,165; and 5,844,781.

Traditionally, network protector relays were electromechanical devices, which tripped the circuit breaker open upon detection of power flow in the reverse direction. The electromechanical network protector relays are being replaced. One type of electronic network protector relay mimics the action of the electromechanical relay by calculating power flow.

Another type of electronic network protector relay uses sequence voltages and currents to determine the direction of current flow for making tripping decisions. Sequence analysis, upon which such relays are based, generates three vector sets to represent a three-phase voltage or current: (1) a positive sequence vector, (2) a negative sequence vector, and (3) a zero sequence vector. U.S. Pat. No. 3,947,728 discloses a sequence based network protector relay, which uses the positive sequence current and positive sequence voltage vectors to make trip decisions.

More recently, digital sequence based network protector relays have been utilized which periodically sample (e.g., 8, 16, 32 times per cycle) the current and voltages.

FIG. 1 illustrates a secondary power distribution network system 1, which includes a low-voltage grid 3 servicing various loads 5. The secondary network bus or grid 3 is energized by multiple sources in the form of feeders 7a, 7b, 7c, 7d. Feeders 7a and 7b are supplied directly from substations 9a and 9b, respectively. Each of the feeders 7a–7d respectively includes a feeder bus 11a–11d, a switch 13a–13d, a feeder transformer 15a–15d, and a network protector 17a–17d. The secondary network system 1 and its components are three-phase wye or delta connected, although FIG. 1 shows these as a single line for clarity. Each of the network protectors 17a–17d includes network protector circuit breakers 19a–19d and network protector control relays 21a–21d, respectively.

As disclosed in U.S. Pat. No. 5,822,165, which is incorporated by reference herein, the control relays 21a–21d each include a microcontroller-based circuit (not shown) which monitors the network phase to neutral voltages Vn (e.g., Van, Vbn, Vcn), the transformer phase to neutral voltages Vt (e.g., Vat, Vbt, Vct), and the feeder currents I (e.g., Ia, Ib, Ic).

Typically, control relays include a communication module for communication with a remote station over a communication network (or "communication subsystem" in order to avoid confusion with the secondary network bus 3). For example, one or more MPCV control relays, which are marketed by Cutler-Hammer of Pittsburgh, Pa., may be connected to the communication subsystem (e.g., without limitation, INCOM physical communication layer, and PowerNet or IMPACC Series III communication software, as marketed by Cutler-Hammer) to allow remote access to protector measurement data of interest. In turn, the control relays perform breaker trip and reclose functions.

Advances in solid-state technology continue to improve the functionality of network protector relays.

U.S. Pat. No. 5,822,165 discloses a network protector relay, for example, whereby the flexibility of more powerful processing resources relative to first generation solid-state relays and the even older electromechanical designs allow for providing a more robust and safe low-voltage power distribution network.

The primary responsibility of a network protector relay is to recognize and react to backfeed conditions (i.e., power leaving a low-voltage network grid). In the event that the amount of backfeeding power meets the programmed setpoints of the relay, then the relay trips the network protector circuit breaker and, thus, isolates the feeder circuit. The other major responsibility of the relay is, of course, deciding when the transformer voltage conditions are within programmed parameters relative to the network bus voltages, in order to command a reclosure of the network breaker.

Referring to FIG. 2, a phasor diagram 31 shows a traditional network relay trip characteristic. The network voltage phasor reference is shown as vector $V_N$ 33 at 0°. A normal, lagging network load current vector is included for reference as vector $I_{LOAD}$ 35. A network relay should trip the protector circuit breaker on backfeed conditions that will occur when the feeder circuit is faulted or when the feeder circuit is opened. $I_{SC}$ is shown representing a feeder fault backfeed vector 37, lagging the 180° reference 39 due to the dominating network transformer leakage inductance and feeder cable inductance combination. For the case of an open feeder, the dominating term is typically the transformer secondary winding magnetizing inductance, as indicated by current vector $I_M$ 41.

FIG. 2 shows the network protector relay tripping characteristic region 43 (shown in cross-hatch in FIG. 2) with a +5° counterclockwise tilt 45, the purpose of which is to trip on backfeeding currents that may be highly leading the 180° reference 39 due to system cable charging currents indicated by $I_C$, which is represented by vector 46. A corresponding non-trip region 47 is shown above the trip region 43. The threshold line of the trip region 43 is sloped 5 degrees to compensate for phase shift (e.g., in the network transformers; in the current transformers which measure the currents). This avoids unnecessary tripping in response to temporary reverse current conditions which could be caused for instance by a regenerative load on the network 3.

The described vectors 33,35,37,41,46 are not drawn to a particular scale, but are simply graphical representations of various system conditions. RT represents the reverse trip setpoint 48 of the network protector relay. In this regard, the circuit breaker 103 has a rated value of current. Typically, the reverse trip setpoint RT 48 is about 0.2% of the rated value of current and is associated with the positive sequence current vector $I_{SC}$ 37. The intention is that at every network protector relay location, each relay has all possible system current backfeed conditions fall within the trip region 43 of FIG. 2.

There is room for improvement in network protector relays.

SUMMARY OF THE INVENTION

These needs and others are satisfied by the invention, which is directed to the trip functionality of a network protector relay, which employs two different trip characteristics by adding a "Gull-Wing" trip region to the existing traditional trip region.

As one aspect of the invention, a network protector relay for controlling a circuit breaker connected between a polyphase feeder bus and a polyphase network bus comprises: means for sampling polyphase current flowing through the circuit breaker and polyphase network voltage on the network bus to generate digital polyphase current samples and digital polyphase network voltage samples; and digital processor means comprising: means for generating a positive sequence current vector and a positive sequence voltage vector from the digital polyphase current samples and the digital polyphase network voltage samples, means for tripping the circuit breaker open in response to the positive sequence current vector being in a first trip region of a first trip characteristic with respect to the positive sequence voltage vector, the first trip characteristic defined by a first reverse trip setpoint and a first positive angle, and means for tripping the circuit breaker open in response to the positive sequence current vector being in a second trip region of a second trip characteristic with respect to the positive sequence voltage vector, the second trip characteristic defined by a second reverse trip setpoint and a second negative angle.

The first positive angle may be about +5 degrees. Preferably, the second negative angle is about −5 degrees.

The digital processor means may include means for storing the second negative angle as a predetermined negative angle, or means for configuring the second negative angle.

Preferably, the circuit breaker has a rated value of current between the polyphase network bus and the polyphase feeder bus associated with the positive sequence current vector, and the reverse trip setpoint is about 0.2% of the rated value of current.

As another aspect of the invention, a method of controlling a circuit breaker connected between a polyphase feeder bus and a polyphase network bus comprises: sampling polyphase current flowing through the circuit breaker and polyphase network voltage on the network bus to generate polyphase current samples and polyphase network voltage samples; generating a positive sequence current vector and a positive sequence voltage vector from the polyphase current samples and the polyphase network voltage samples; employing a first reverse trip setpoint and a first positive angle to define a first trip characteristic having a first trip region with respect to the positive sequence voltage vector; employing a second reverse trip setpoint and a second negative angle to define a second trip characteristic having a second trip region with respect to the positive sequence voltage vector; tripping the circuit breaker open in response to the positive sequence current vector being in the first trip region of the first trip characteristic; and alternatively tripping the circuit breaker open in response to the positive sequence current vector being in the second trip region of the second trip characteristic.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

There have been several recently reported episodes where network protector relays failed to trip the network circuit breaker during a feeder fault event. Investigation into these occurrences has led to a theory that suggests that with newer, more efficient network transformers, relatively higher X/R ratio ratings (e.g., 8 to 12) are more commonplace. With such transformers, the resulting backfeed current under fault conditions, especially faults in close proximity to the transformer, potentially yield backfeed currents ($I_{SC}$) that are more lagging (i.e., clockwise shifted) than what a lower X/R transformer would produce. In the worst case, the backfeed current can approach a purely inductive 90° lag. With present day transformer technology, it is less likely that an open feeder magnetizing current backfeed $I_M$ would approach a purely inductive 90° lag, but it is still a plausible concern.

Figure 3:
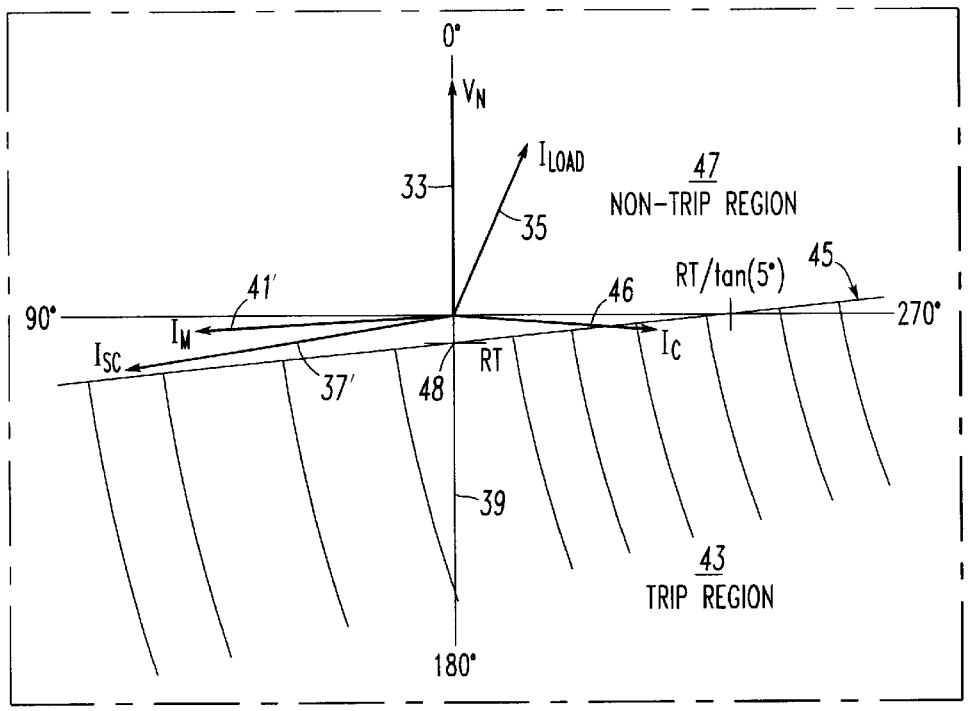
FIG. 3 is a plot showing a backfeed problem of a network protector relay.

FIG. 3 shows a scenario whereby a feeder fault backfeed vector 37' ($I_{SC}$) and a current vector 41' ($I_M$) both could fail to meet the traditional 5° tilt trip criteria (e.g., trip region 43), thereby resulting in no trip action from the network protector relay when it should command a breaker trip. Unfortunately, the 5° tilt 45, which is deployed to guarantee a protector trip should the feeder system exhibit dominating cable capacitance for the case of an open feeder, reduces, and may even eliminate, the effective trip margin at the left plane region boundary.

Figure 1:
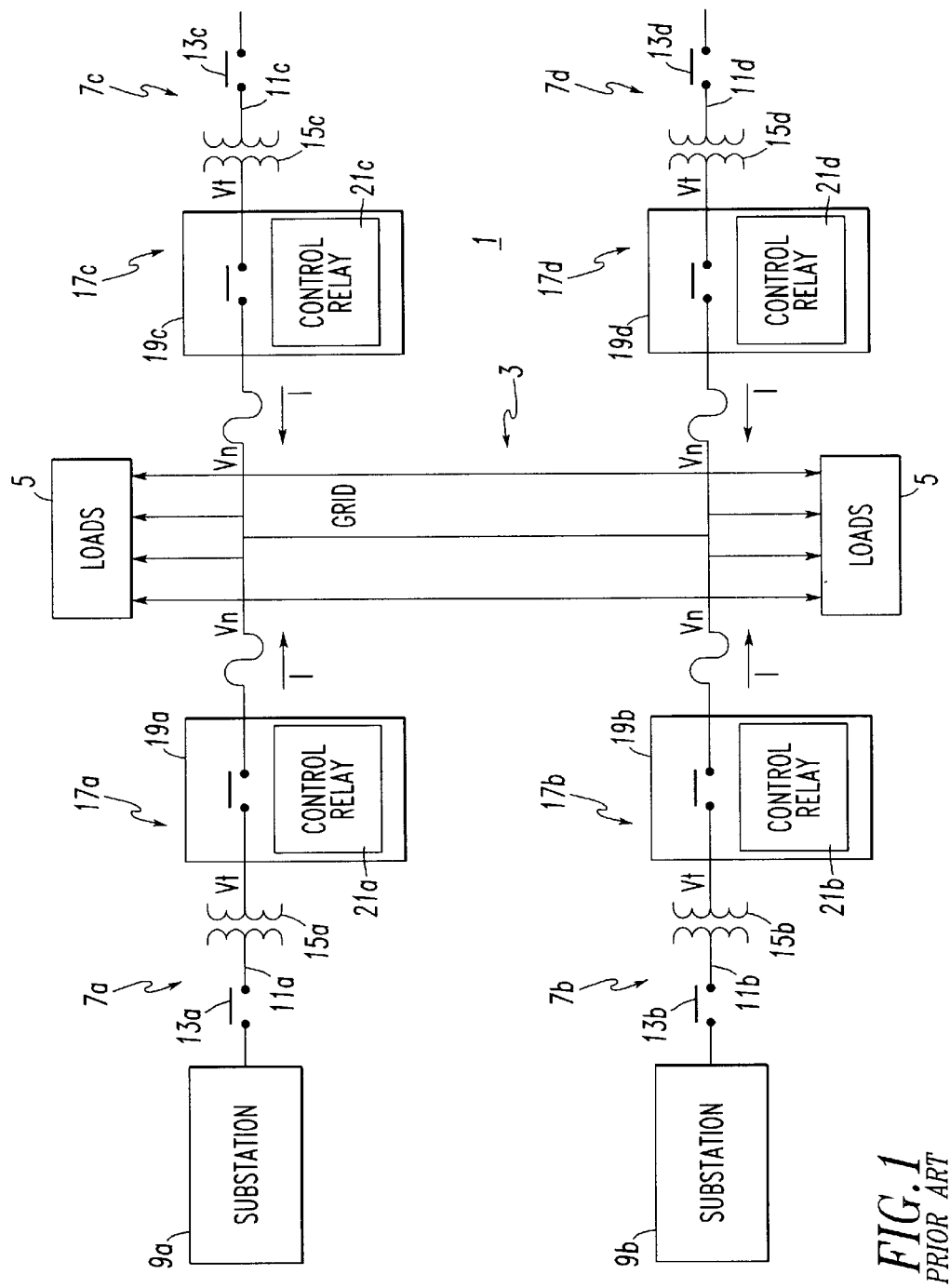
FIG. 1 is a schematic diagram of a low-voltage secondary power distribution network sourced by feeders incorporating network protector relays.
Figure 4:
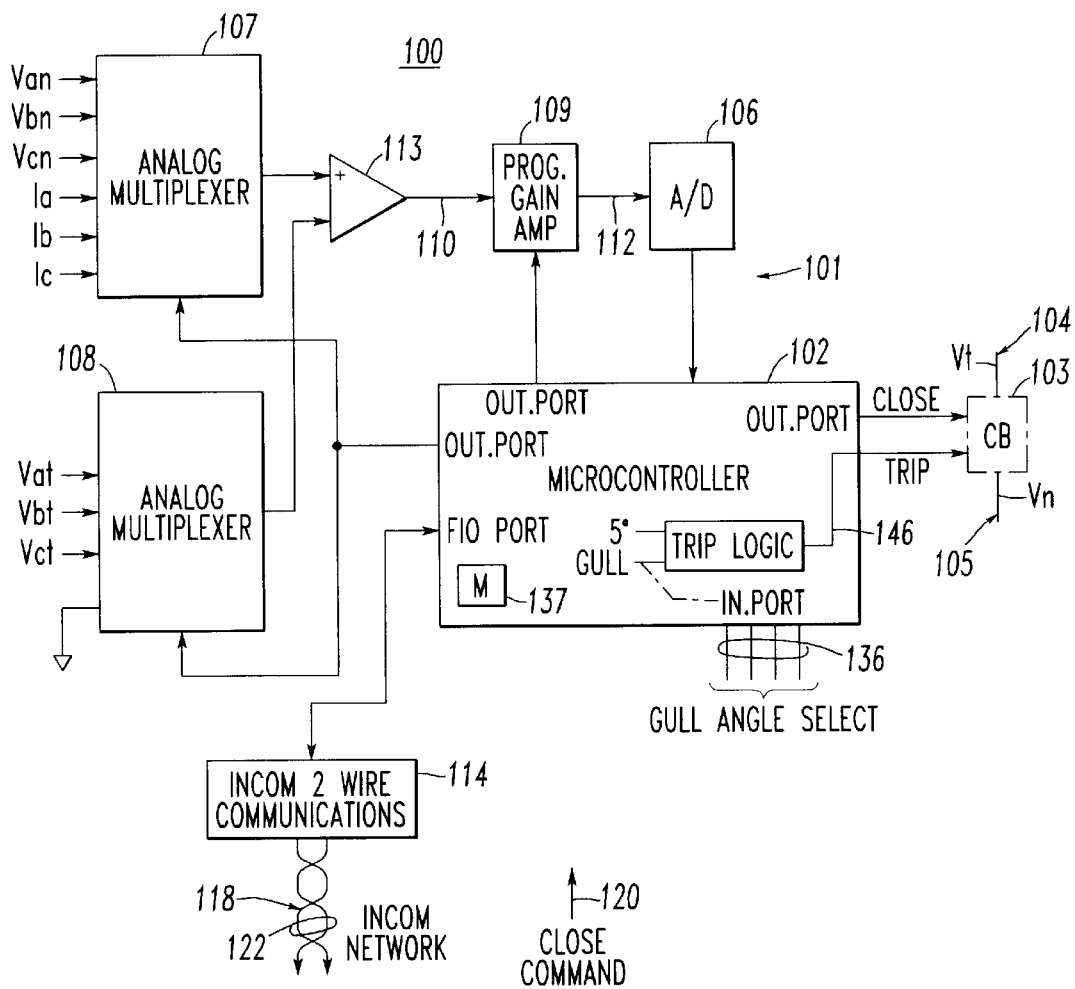
FIG. 4 is a block diagram of a network protector relay in accordance with the present invention.

Referring to FIG. 4, a block diagram of a network protector relay 100 is illustrated. The relay 100 includes a sampling circuit 101 and a microcontroller 102 which monitor the network phase to neutral voltages Van, Vbn, Vcn (e.g., Vn of FIGS. 1 and 4), the transformer phase to neutral voltages Vat, Vbt, Vct (e.g., Vt of FIGS. 1 and 4), and the feeder currents Ia, Ib, Ic (e.g., I of FIG. 1) through current transformers (not shown). The relay 100 controls a circuit breaker (CB) 103, which is connected between a polyphase feeder bus 104 and a polyphase network bus 105. A single exemplary 11-bit plus sign analog to digital (A/D) converter 106 digitizes the polyphase currents and voltages for input to the microcontroller 102. Since a single A/D converter 106 is employed, the voltages and currents are sequentially fed thereto by analog multiplexers 107, 108 under the control of the microcontroller 102.

As the range of currents can vary widely from reverse magnetization currents of a few ten thousandths per unit to forward overcurrents of about fifteen per unit, a programmable gain amplifier 109 adjusts the gain (e.g., 1, 2, 4, 8, 16) applied to the analog input 110 for application at the input 112 of the A/D converter 106. As disclosed in U.S. Pat. No. 5,822,165, the microcontroller 102 utilizes the sensed currents and voltages in algorithms which generate a circuit breaker trip signal (i.e., signal 140 of FIG. 6) in response to detection of reverse current flowing out of the network bus 105 into the feeder bus 104 (e.g., out of network 3 into one or more of the feeders 7a, 7b, 7c, 7d of FIG. 1), and also in response to forward currents which exceed a preset current/time characteristic. In turn, the control relay 100 performs breaker trip and reclose functions.

The network phase to neutral voltages Van, Vbn, Vcn on the network bus 105 are sensed through the analog multiplexer 107, with the other analog multiplexer 108 outputting a ground reference G to the negative input of difference buffer 113, which generates analog polyphase network voltage samples at the analog input 110 of the programmable gain amplifier 109. Alternatively, the buffer 13 generates analog polyphase phasing voltage samples (i.e., Vp (not shown)), which are the differences between the network voltages Vn and the transformer voltages Vt, and which are the voltages across the open circuit breaker 103). The circuit 101 samples polyphase current Ia, Ib, Ic flowing through the circuit breaker 103 and polyphase network voltage Van, Vbn, Vcn on the network bus 105 to generate digital polyphase current samples and digital polyphase network voltage samples.

The relay 100 also includes a communication module 114 for communications with a remote station, such as personal computer (PC) (not shown), over a communication subsystem 118. In the exemplary subsystem 118, an INCOM communication subsystem utilizes a protocol, which is proprietary to Eaton Corporation, although any suitable communication subsystem may be used. For example, the remote PC may send a close command 120 over the INCOM cable 122 to the relay 100.

Figure 5:
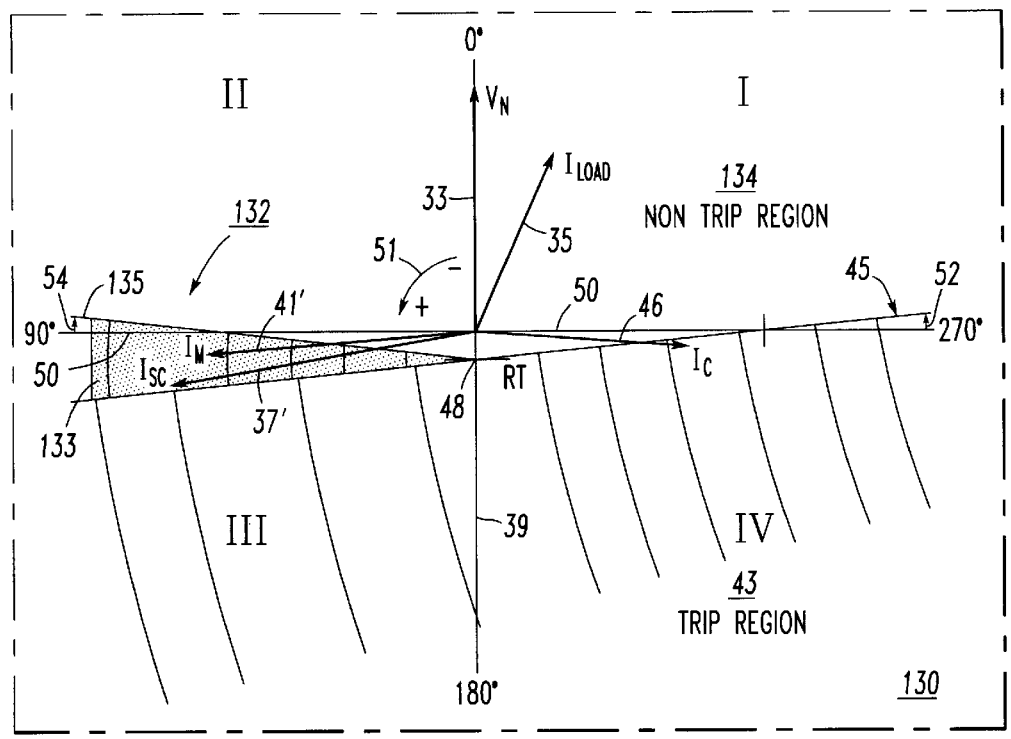
FIG. 5 is a plot of a "Gull-wing" trip characteristic in accordance with the present invention.

FIG. 5 shows a plot 130 of the traditional network protector relay trip region 43 and a "Gull-wing" trip characteristic 132 having a trip region 133 (shown in cross-hatch in FIG. 5) in accordance with the present invention. A corresponding non-trip region 134 is shown above the trip regions 43 and 133.

For example, the flexibility and DSP (digital signal processing) power of solid-state designs, such as the MPCV relay or the microcontroller 102 of FIG. 4, can readily deploy such a trip characteristic 132. The MPCV presently employs DSP representations of the symmetrical components of the network bus voltages Vn and circuit breaker currents I, in order to provide the traditional 5°-tilt characteristic 45. To logically implement the new "Gull-Wing" region 133, the firmware code of the microcontroller 102 also checks the boundary for a 5° tilt in the opposite direction (i.e., a −5° tilt 135).

As shown in FIG. 5, both of the regions 43 and 133 intercept the 180° reference 39 at RT, the reverse trip setpoint 48 of the network protector relay 100. Although an exemplary −5° tilt 135 is shown, another suitable negative value (e.g., without limitation, about −10°, less than −5°, greater than −5° but less than 0°) may be employed (e.g., without limitation, a value which is hardcoded into the firmware of the microcontroller 102 of FIG. 4, a value which is configured through a microcontroller port 136). In this manner, an absolute value of the negative tilt angle may be different from the exemplary 5° tilt value. The microcontroller 102 of FIG. 4 includes a suitable memory (M) 137 for storing the predetermined or configured negative angle.

The vector $V_N$ at 0° of FIG. 5 is normal to a reference 50 at 90° and 270°. Those angles, like the 180° reference line 39, are defined in a counterclockwise direction 51 from the vector $V_N$ at 0°. A first positive angle 52 (e.g., measured counterclockwise with respect to FIG. 5) is defined between the reference 50 and the traditional 5°-tilt characteristic 45. A second negative angle 54 (e.g., measured clockwise and, thus, opposite the counterclockwise direction 51) is defined between the reference 50 and the −5° tilt 135 of the "Gull-Wing" trip characteristic 132.

The characteristic 45 is defined with respect to a first reverse trip setpoint RT 48. The −5° tilt 135 may be defined with respect to a second reverse trip setpoint RT' (FIG. 6) or the first reverse trip setpoint RT (FIG. 5).

Figure 2:
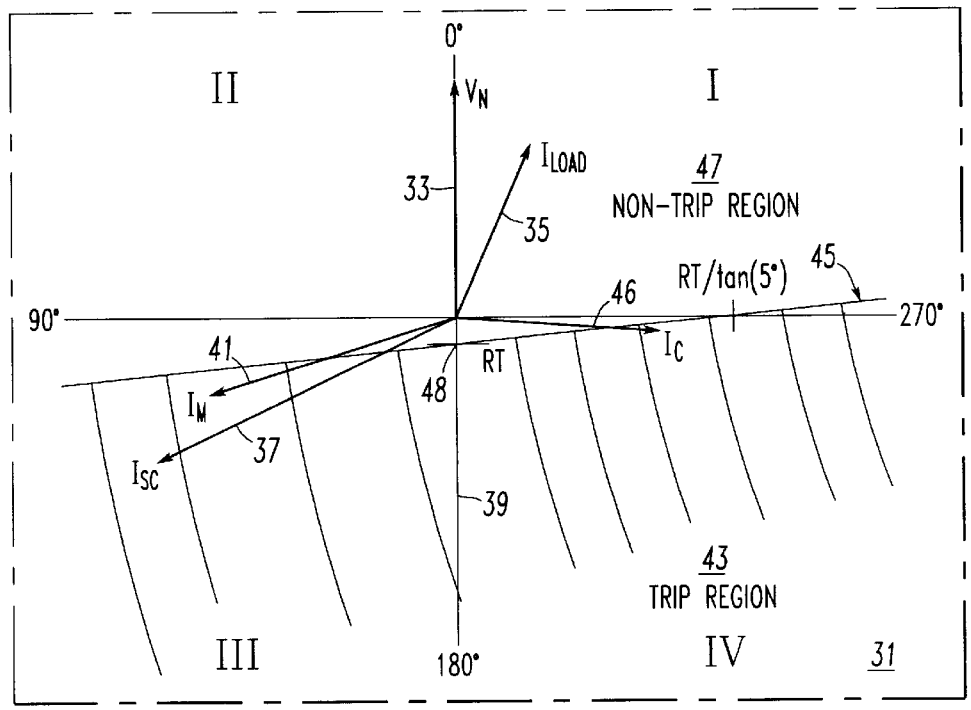
FIG. 2 is a plot of a traditional network protector relay trip characteristic.
Figure 6:
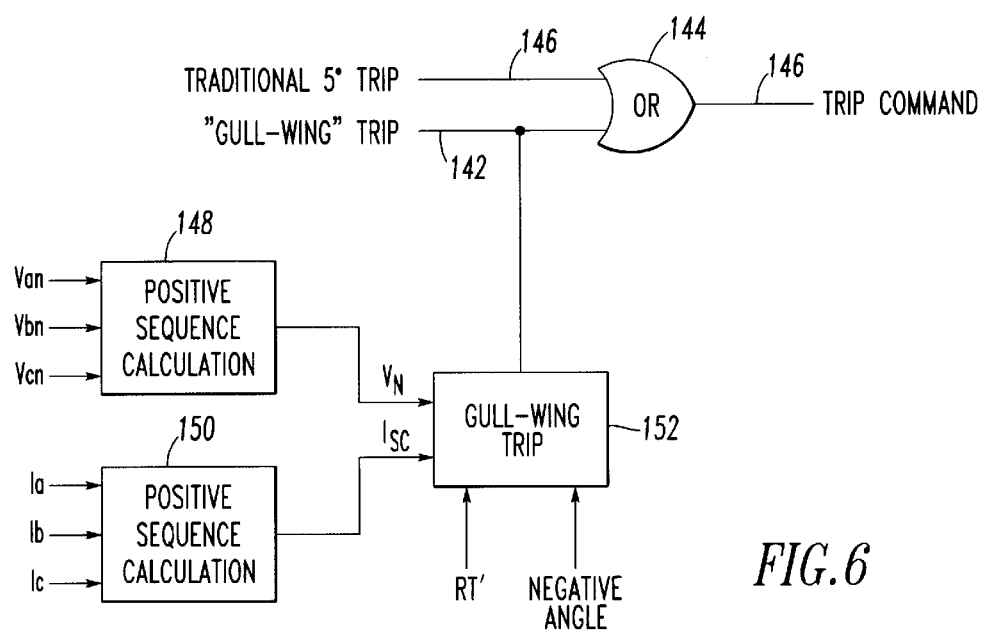
FIG. 6 is a block diagram showing the logical implementation of the traditional network protector relay trip of FIG. 2 and the "Gull-wing" trip of FIG. 5 in accordance with the present invention.

FIG. 6 shows the logical implementation of the traditional network protector relay trip signal 140 as determined from the trip region 43 of FIG. 2, and the "Gull-wing" trip signal 142 as determined from the trip region 133 of FIG. 5 in accordance with the invention. The signals 140 and 142 are input by the logical OR function 144, and a resulting trip command 146 is issued if the feeder fault backfeed vector 37' ($I_{SC}$) exceeds either of the tilted trip boundaries (e.g., 5° tilt and −5° tilt) and enters one of the corresponding trip regions 43 and 133.

The "Gull-Wing" trip signal 142 is determined based on measuring reverse current flow, that is, current flow from the network 3 to the feeders 7a–7d. Thus, the network positive sequence voltage $V_N$ is calculated at 148 from the network phase voltages. The positive sequence current $I_{SC}$ is also calculated at 150 from the phase currents. The reverse current calculation and "Gull-Wing" trip decision is then made at 152. This process can be visualized by the observing the positions of the positive sequence current $I_{SC}$ vector 37' and network positive sequence voltage $V_N$ vector 33 in the complex plane as illustrated in FIG. 5. Real power flow (Watts) from one or more of the feeders 7a–7d to the network 3 occurs in quadrants I and II of FIG. 5. On the other hand, real power flow is from the network 3 to the feeder(s) in quadrants III and IV. The trip signal 142 is set active if the positive sequence current $I_{SC}$ vector 37' lies in the trip region 133.

Figure 7:
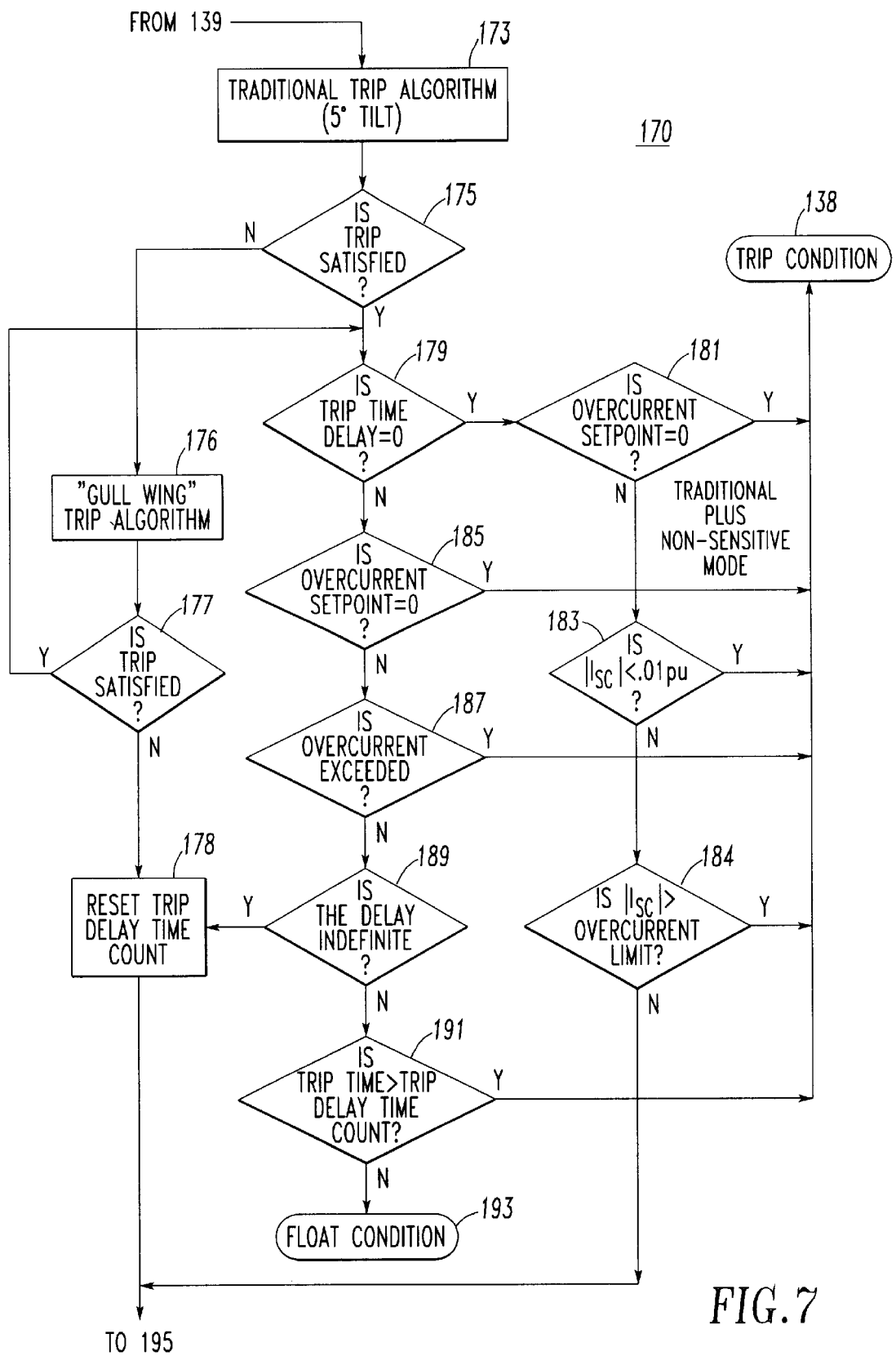
FIG. 7 is a flow chart and block diagram of a routine utilized by the network protector relay of FIG. 4 for the trip functions of FIGS. 2 and 5.

Referring to FIG. 7, a flow chart and block diagram shows the routine 170 employed by the network protector relay 100 of FIG. 4 for the trip functions of FIGS. 2 and 5. As employed in FIG. 7, reference numbers 139, 179, 181, 183, 185, 187, 189, 191, 193 and 195 correspond to the same numbered steps of FIG. 8E of U.S. Pat. No. 5,822,165.

As disclosed in U.S. Pat. No. 5,822,165, following a pumping routine (not shown), if a remote trip command (not shown) has been received over the communications network 118 of FIG. 4, a trip condition 138 is generated. Otherwise, a determination is made at 139 as to whether a "watt-var" mode has been enabled. If not, the program transfers to the traditional (sensitive) trip algorithm at 173 of FIG. 7. This algorithm implements the trip characteristic 31 shown in FIG. 2. Initially, the traditional trip algorithm is run at 173. If the traditional trip is not satisfied at 175, that is, the positive sequence current vector $I_{SC}$ 37' is not in the trip region 43 of FIGS. 2 and 5, then the program transfers to the "Gull-wing" trip algorithm at 176 of FIG. 7. This algorithm implements the trip characteristic of the "Gull-wing" region 133 shown in FIG. 5. If the "Gull-wing" trip is satisfied at 177, then step 179 is executed as discussed below. Otherwise, the trip delay time count is reset at 178.

On the other hand, if the traditional trip is satisfied at 175, and the trip delay time has been set to 0, as determined at 179, and the overcurrent setpoint is 0 as determined at 181, then a trip condition 138 is generated. If a traditional plus non-sensitive mode has been selected, which includes a small semi-circular instantaneous trip region (not shown), then a trip condition 138 is generated if the positive sequence current vector $I_{SC}$ 37' is within that region as indicated at 183. The instantaneous trip condition can occur when the feeder is open and there is reverse current magnetizing the secondary of the feeder transformer. The trip condition 138 is also generated if the positive sequence current vector $I_{SC}$ 37' is more than the overcurrent limit, as indicated at 184.

Returning to block 179, if the time delay is other than zero and the overcurrent setpoint is equal to zero, as indicated at 185, then a trip condition 138 is generated. A trip condition 138 is also generated if the overcurrent is exceeded at 187. If not, and the delay is infinite as determined at 189, then the trip delay time count is reset at 178. Otherwise, a check is made at 191 to see if a delayed trip has been generated. If the time has not expired at 191, then a float condition is indicated at 193. Otherwise, a trip condition 138 is generated.

After 178, tests are provided to determine if an open circuit breaker can be closed. If the negative sequence phasing voltage is high at 195, this indicates improper wiring, such as crossed phases on the transformer or the network, and, therefore, a trip condition is generated at 138.

The exemplary network protector relay 100 provides a "Gull-Wing" trip characteristic 132. This provides enhanced trip functionality over a traditional network protector relay trip characteristic as deployed by electromechanical and first generation solid state devices. The exemplary trip characteristic 132 provides a novel mechanism of addressing all possible network backfeed system conditions including those with implementations of low-loss feeder transformers which could result in sustained system backfeeds if existing conventional network protector relay technology were utilized.

Any solution proposals to the described backfeed condition that might suggest tuning the traditional tilt angle 45 to the particular system parameters at a given location are flawed in that for the very worst case, the open feeder system extremes for the resulting backfeed ($I_M$ or $I_C$) are in theory 180° apart. Therefore, no matter how well the tilt angle is tuned, the 180° boundary remains without any margin. On the other hand, the exemplary "Gull-Wing" trip region 133 encapsulates the 180° theoretical spread and a needed safety margin.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A network protector relay for controlling a circuit breaker connected between a polyphase feeder bus and a polyphase network bus, said network protector relay comprising:
    means for sampling polyphase current flowing through said circuit breaker and polyphase network voltage on said network bus to generate digital polyphase current samples and digital polyphase network voltage samples; and
    digital processor means comprising:
        means for generating a positive sequence current vector and a positive sequence voltage vector from said digital polyphase current samples and said digital polyphase network voltage samples,
        means for tripping said circuit breaker open in response to said positive sequence current vector being in a first trip region of a first trip characteristic with respect to said positive sequence voltage vector, said positive sequence voltage vector being normal to a reference, said first trip characteristic defined by a first reverse trip setpoint and a first positive angle, said first positive angle being defined between said reference and said first trip characteristic, and
        means for tripping said circuit breaker open in response to said positive sequence current vector being in a second trip region of a second trip characteristic with respect to said positive sequence voltage vector, said second trip characteristic defined by a second reverse trip setpoint and a second negative angle, said second negative angle being defined between said reference and said second trip characteristic.

2. The network protector relay of claim 1 wherein said first positive angle is about +5 degrees.

3. The network protector relay of claim 1 wherein said second negative angle is about −5 degrees.

4. The network protector relay of claim 1 wherein said digital processor means further comprises means for storing said second negative angle as a predetermined negative angle.

5. The network protector relay of claim 1 wherein said digital processor means further comprises means for configuring said second negative angle.

6. The network protector relay of claim 1 wherein an absolute value of said second negative angle is equal to said first positive angle.

7. The network protector relay of claim 1 wherein an absolute value of said second negative angle is different from said first positive angle.

8. The network protector relay of claim 1 wherein said digital processor means further comprises means for tripping said circuit breaker in response to said positive sequence current vector being in the second trip region of said second trip characteristic for a time period greater than a delay time associated with said second trip characteristic.

9. The network protector relay of claim 1 wherein said digital processor means further comprises means for instantaneously tripping said circuit breaker.

10. The network protector relay of claim 1 wherein said circuit breaker has a rated value of current between said polyphase network bus and said polyphase feeder bus associated with said positive sequence current vector; and wherein said first and second reverse trip setpoints are about 0.2% of said rated value of current.

11. A method of controlling a circuit breaker connected between a polyphase feeder bus and a polyphase network bus, said method comprising the steps of:

sampling polyphase current flowing through said circuit breaker and polyphase network voltage on said network bus to generate polyphase current samples and polyphase network voltage samples;

generating a positive sequence current vector and a positive sequence voltage vector from said polyphase current samples and said polyphase network voltage samples;

employing a reference normal to said positive sequence voltage vector;

employing a first reverse trip setpoint and a first positive angle to define a first trip characteristic having a first trip region with respect to said positive sequence voltage vector;

defining said first positive angle between said reference and said first trip characteristic;

employing a second reverse trip setpoint and a second negative angle to define a second trip characteristic having a second trip region with respect to said positive sequence voltage vector;

defining said second negative angle between said reference and said second trip characteristic;

tripping said circuit breaker open in response to said positive sequence current vector being in the first trip region of said first trip characteristic; and alternatively tripping said circuit breaker open in response to said positive sequence current vector being in the second trip region of said second trip characteristic.

12. The method of claim 11 further comprising:

employing as said first positive angle an angle of about +5 degrees.

13. The method of claim 11 further comprising:

employing as said second negative angle an angle of about −5 degrees.

14. The method of claim 11 further comprising:

employing as said second negative angle a predetermined negative angle.

15. The method of claim 11 further comprising:

configuring said second negative angle.

16. The method of claim 11 further comprising:

employing an absolute value of said second negative angle equal to said first positive angle.

17. The method of claim 11 further comprising:

employing an absolute value of said second negative angle which is different than said first positive angle.

18. The method of claim 11 further comprising:

employing a delay time associated with said second trip characteristic; and tripping said circuit breaker in response to said positive sequence current vector being in the second trip region of said second trip characteristic for a time period greater than said delay time.

19. The method of claim 11 further comprising:

employing an instantaneous trip function in combination with at least one of said first and second trip characteristics.

20. The method of claim 11 further comprising:

employing a rated value of current between said polyphase network bus and said polyphase feeder bus associated with said positive sequence current vector; and employing the first and second reverse trip setpoints which are about 0.2% of said rated value of current.

* * * * *